US008016281B1

(12) United States Patent
Sting et al.

(10) Patent No.: US 8,016,281 B1
(45) Date of Patent: Sep. 13, 2011

(54) MAIL-PROCESSING MACHINE

(75) Inventors: Martin Sting, Bad Vilbel (DE); Axel Brauneis, Munzenberg (DE)

(73) Assignee: Pitney Bowes Deutschland GmbH, Heppenheim (DE)

( * ) Notice: Subject to any disclaimer, the term of this patent is extended or adjusted under 35 U.S.C. 154(b) by 0 days.

(21) Appl. No.: 09/701,961

(22) PCT Filed: May 27, 1999

(86) PCT No.: PCT/IB99/01171

§ 371 (c)(1), (2), (4) Date: Feb. 20, 2001

(87) PCT Pub. No.: WO99/65707

PCT Pub. Date: Dec. 23, 1999

(30) Foreign Application Priority Data

Jun. 18, 1998 (DE) .................................. 198 27 235

(51) Int. Cl.
*B65G 5/00* (2006.01)

(52) U.S. Cl. .............. 271/2; 271/267; 198/737; 53/569; 53/252; 53/284.3

(58) Field of Classification Search .................... 53/569, 53/525, 284.3, 564, 252; 271/2, 267, 269, 271/264; 198/737, 741–743, 746, 747, 373; 209/900
See application file for complete search history.

(56) References Cited

U.S. PATENT DOCUMENTS 3,170,572 A 2/1965 Harison
3,554,533 A * 1/1971 Cox .................................. 271/2
3,965,644 A 6/1976 Stocker
4,416,450 A 11/1983 vanWijngaarden ........... 271/303
4,720,960 A 1/1988 Green ............................. 53/447
5,052,542 A 10/1991 Jestetten ....................... 198/372
5,284,004 A 2/1994 Metzler
5,457,935 A 10/1995 Kope .............................. 53/258
6,189,702 B1 2/2001 Bonnet .......................... 209/651
6,289,658 B1 * 9/2001 Sting et al. ...................... 53/569

FOREIGN PATENT DOCUMENTS

DE 19500746 A1 1/1995
JP 6-56111 * 3/1994

* cited by examiner

*Primary Examiner* — Mark A Deuble

(74) *Attorney, Agent, or Firm* — Michael J. Cummings; Charles R. Malandra, Jr.

(57) ABSTRACT

In the case of a mail-processing machine having a conveying path (1) which contains a circulating conveying chain and conveys onto a handling station (5), easy changeover to a variety of processing tasks and good adaptability to constricted space conditions are achieved in that, by a switchable actuating arrangement, manipulator fingers (19) articulated on a manipulator hand (13), in the handling station (5), can be switched both into the operating position both for the forward stroke of the manipulator hand and for the return stroke of the manipulator hand and into the return position both for the return stroke of the manipulator hand and for the forward stroke of the manipulator hand. Free through-passage-channel areas (32, 33) for sheet like article and sets thereof which are to be processed further or are to be inserted into envelopes are provided in the handling station, not only with regard to the direction (F) from the feeding conveying chain and to a laterally adjacent first processing arrangement but also in the opposite direction perpendicular to the feed direction of the first conveying chain.

11 Claims, 2 Drawing Sheets

MAIL-PROCESSING MACHINE

TECHNICAL FIELD

The invention relates to a mail-processing machine having a conveying path on which the upper reach of a circulating first conveyor, particularly a conveying chain, forms intermittently or continuously conveyed transport sections for sheet like articles and feeds to a handling station such sheet like articles or sets thereof having been placed into said transport sections.

RELATED ART

In said handling station, a manipulator hand may be movable, by means of a manipulator drive, over a base plate in a direction perpendicular to the conveying direction of the first conveyor, sheet like articles or sets thereof fed onto the base plate by the conveyor being moved by the manipulator hand, particularly by means of conveying fingers articulated on the manipulator hand, into a first processing arrangement, which is located alongside the base plate. The manipulator fingers can be raised, for a return stroke, and lowered, for an operating stroke, in relation to the base plate by means of an actuating arrangement.

Mail-processing machines of this type having as a handling station an envelope-filling station or inserter, wherein manipulator fingers push the sheet like articles or sets thereof, which are pushed onto the base plate of the insertion station by the conveyor, into the openings of envelopes, which are provided in the abovementioned first processing arrangement in synchronism with feeding of sheet like articles or sets of sheet like articles and in synchronism with the operation of the inserter, are well known in the art.

It is also known for sheet like articles or sets thereof fed onto the base plate of an inserter station by a first conveying chain, to be allowed to advance up of an inserter station by a first conveying chain, to be allowed to advance up against an optionally lowerable or raisable stop on that side of the base plate of the inserter station which is remote from said first conveying chain and, either for said sheet like articles or sets thereof to be pushed, by the manipulator fingers of the operative inserter station, into envelopes provided alongside the base plate, in the first processing arrangement, or, e.g. if the inserter arrangement of the handling station should be inoperative, for the abovementioned stop to be raised and said sheet like articles or sets thereof to be conveyed further from the base plate, by conveying means, in continuation of the direction in which they have been conveyed up by the first conveying chain. Such sheet like articles or sets thereof conveyed further may then be fed to separate processing in downstream stations and pushed into different envelopes, for example, in another inserter station.

SUMMARY AND OBJECTS OF THE INVENTION

The object of the present invention is to configure a mail-processing machine of the general type defined in the introduction, such that, even in the case of spatial restrictions at the set-up location, a variety of processing steps can be performed and easy changeover to different processing tasks is achieved.

The object is achieved according to the invention by the features of claim 1.

Advantageous configurations, developments and modifications form the subject matter of the claims which follow claim 1 and, without the wording of these claims being specifically repeated here, reference is taken expressly to the subject matter of these claims.

A mail-processing machine of the type specified here thus contains, at the end or along the route of a first conveying path, a handling station, from the base plate of which sheet like articles or sets thereof fed thereto by the first conveying chain, can be passed on, perpendicularly to the conveying direction of the first conveying path, optionally to one side or to the other side, to a first processing arrangement or to a second processing arrangement.

These processing arrangements, in turn, either may serve for inserting the sheet material or sets thereof into envelopes or may, in turn, contain conveying chains, that is to say a second conveying chain and a third conveying chain for example, which for their part, lead the sheet like articles or sets thereof through further processing stations.

According to a very advantageous feature of one embodiment, such conveying chains, as well as the first-mentioned conveying chain, can be reversed, as a result of which the handling station of the mail-processing machine specified here, in conjunction with the reversible conveying chains, becomes a crossover junction with essentially any selectable direction of flow of sheet like articles, or sets thereof, desired.

BRIEF DESCRIPTION OF THE DRAWINGS

Exemplary embodiments are explained in more detail hereinbelow with reference to the drawing, in which.

DETAILED DESCRIPTION OF A PREFERRED EMBODIMENT

Figure 1:
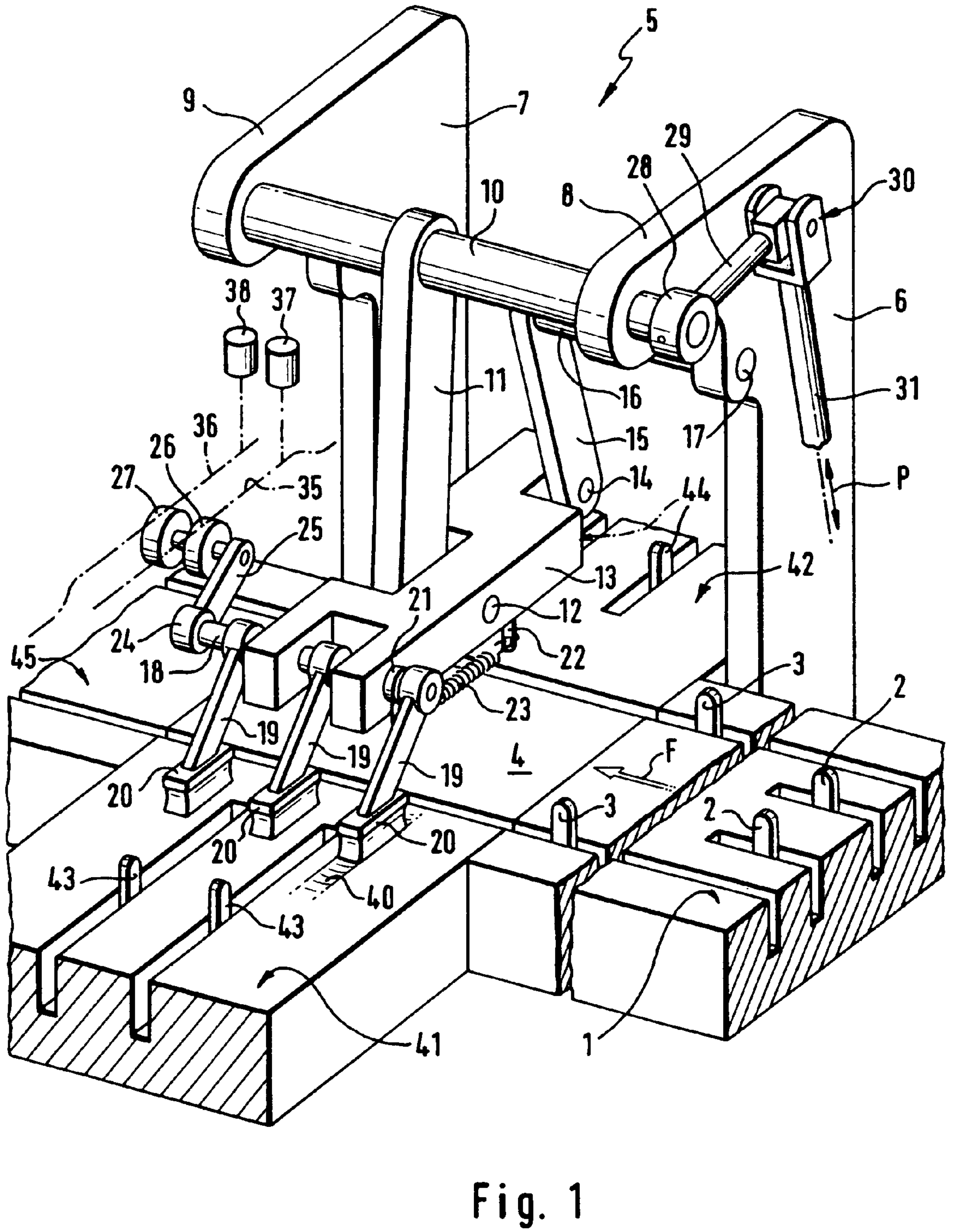
FIG. 1 shows a schematic perspective view of the handling station and conveying paths and/or conveying chains, interacting therewith, of a mail-processing machine of the type specified here.

In the drawings, mutually corresponding parts are defined by the same reference numerals. For illustrative reasons, certain geometrical dimensional relationships which are necessary for certain movement sequences, and result for example in certain operation-stroke ranges, are not included in the drawings, since these geometrical relationships will be easily and clearly discernible from the following description as far as the person skilled in the art is concerned or are known in any case to the person skilled in the art. The illustration thus concentrates on demonstrating the working principle.

The mail-processing machine specified here contains a conveying path 1 with a, for example, continuously circulating endless conveying chain on which there are arranged conveying fingers 2 which project up beyond the surface of the conveying path 1 when they are moved, in a conveying direction, with the upper reach of the conveying chain and dropped beneath the surface of the conveying path 1 when they move with the lower reach of the conveying chain, as is known in general for conveying chains of this type. Groups or pairs of conveying fingers located one beside the other in the conveying direction form transport sections into which sheet like articles or sets thereof are introduced or deposited in operating stations lined up along the conveying path, these operating stations not being shown in the drawing. It is to be understood that guide means are provided laterally along the conveying path, and are intended for bounding the transportation sections laterally, said guide means having been left out in order to simplify the illustration.

In the case of the exemplary embodiment shown, the conveying chain to which there are connected the conveying fingers 2, is driven continuously, and the transportation sections defined by consecutive conveying fingers 2 pass on the sheet like articles or sets thereof which have been introduced therein to an intermittently driven conveying chain. The conveying fingers 3 of the intermittently driven conveying chain, as they move with the upper reach of said intermittently driven conveying chain, project up beyond the surface of the conveying path 1 at a greater lateral spacing than the conveying fingers 2, and drop beneath the level of the conveying path 1 in order then to be moved back with the lower reach of the intermittently operated conveying chain. The conveying direction of the continuously operated conveying chain, which has the conveying fingers 2, and of the intermittently operated conveying chain, which has the conveying fingers 3, is clearly shown by the arrow F in FIG. 1. It can be seen from FIG. 1 that, for illustrative reasons, the longitudinal extent of the active conveying path of the intermittently operated conveying chain has been represented vastly shortened.

The sheet like articles or sets thereof which have been introduced into the transportation sections of the continuously operated conveying chain are transferred to the transportation sections of the intermittently operated conveying chain such that during the continuous advancement of a sheet like article or of a set thereof by a pair of conveying fingers 2, before the latter have dropped beneath the level of the conveying path, a pair of conveying fingers 3 of the intermittently driven conveying chain, downstream of the pair of conveying fingers 2 in the conveying direction, rise up above the level of the conveying path 1 during transfer from the lower reach of said conveying chain to the upper reach thereof and, on account of the intermittently operated conveying chain having a higher drive speed in this phase than the continuously operated conveying chain, said pair of conveying fingers 3 overrides the conveying fingers 2 in the conveying direction and carry along the relevant sheet like article or the relevant set of articles, whereas the conveying fingers 2 of the previously conveying conveying-finger pair then drop beneath the surface of the conveying path 1. The conveying fingers 3 of the intermittently operated conveying chain then push a sheet like article or a set of articles further in the conveying direction until such time as the article or the set of articles bears fully on a base plate 4 of a handling station 5, whereupon the intermittently operated conveying chain is brought to a standstill.

Figure 2:
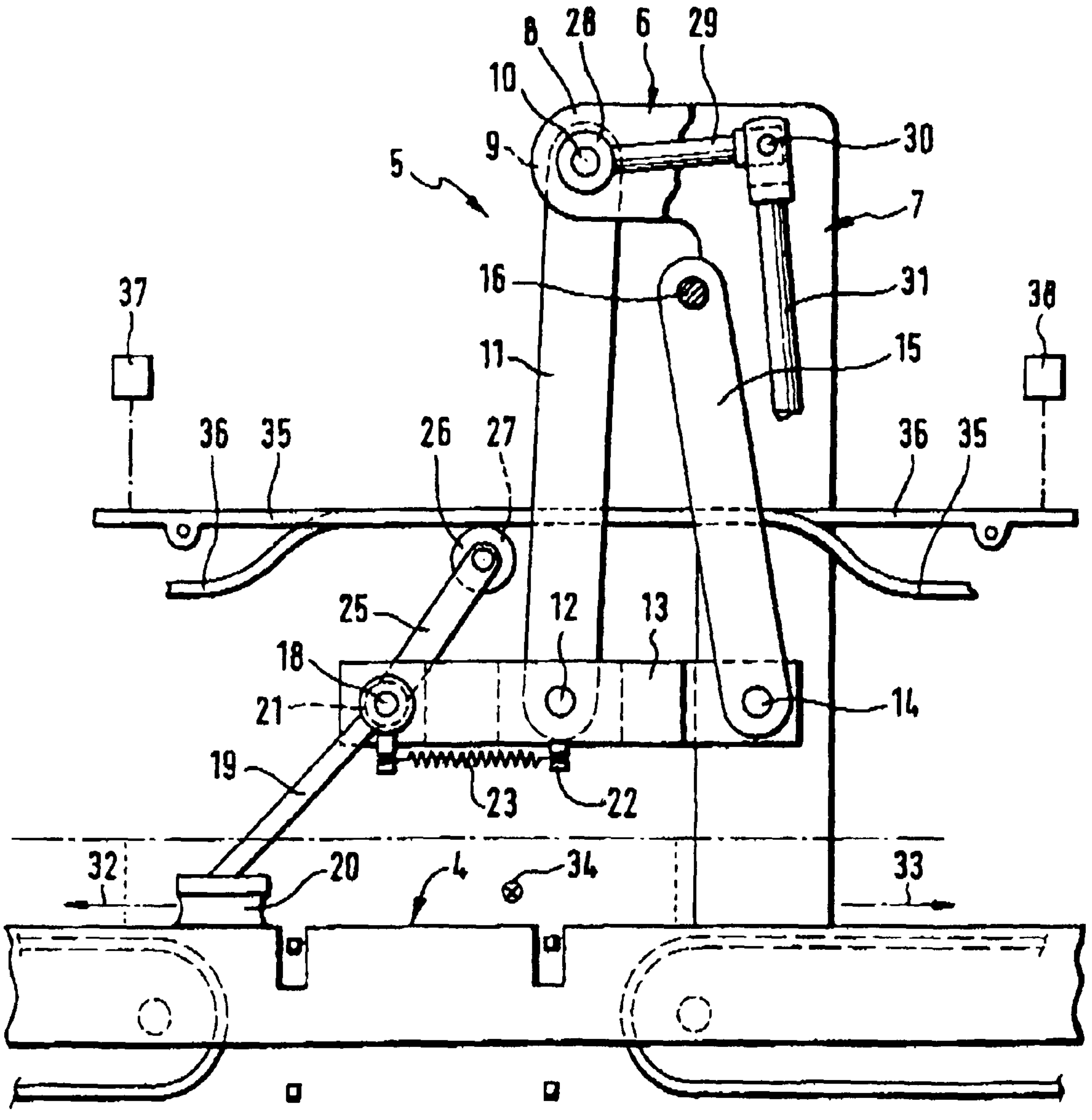
FIG. 2 shows a schematic side view of the manipulator station and associated conveying paths and/or conveying chains according to FIG. 1, as seen in the direction in which the sheet like articles or sets thereof are fed by a first conveying chain.

The handling station 5 contains two side bearing supports 6 and 7 which project up beyond the level of the conveying path 1 and the level of the surface of the base plate 4 and are fastened, parallel to the conveying direction, on a machine framework (not shown in the drawing) at a spacing from one another which is greater than the maximum dimension, in the conveying direction of conveying path 1, of sheet like articles or sets thereof which are to be handled. The significance of this dimensioning is discussed in more detail hereinbelow. The side bearing supports 6 and 7 project upwards, by way of vertical legs, outside the lateral boundary line of the conveying path 1, said boundary line running in the conveying direction corresponding to the arrow F, and extend, by way of the top transverse legs 8 and 9, respectively, into a region above the base plate 4, as can be seen from FIG. 1. Mounted in bearing bores at the free ends of the transverse legs 8 and 9 is an actuating shaft 10, of which the geometrical axis runs parallel to the conveying direction, corresponding to the arrow F, above the base plate 4. Fastened on the actuating shaft 10 is an actuating lever 11, a manipulator hand 13 being articulated at the bottom end thereof via a bearing spindle 12. Furthermore, an actuating link 15 is articulated on the manipulator hand 13 via a bearing shaft 14, the top end of said actuating link being connected pivotably to a horizontal support post 16 which for its part, as is indicated at 17 in FIG. 1, is connected fixedly to the side bearing support 6. It should be mentioned here that, on that side of the actuation link 15 which is remote from the side bearing support 6, the bearing support post 16 essentially does not project beyond said actuating link, such that, in the case of relatively pronounced anticlockwise pivoting of the manipulator hand 13 and of the actuating lever 11 and also of the actuating link 15 in relation to the situation which is illustrated in FIGS. 1 and 2, the actuating lever 11 can be moved past the point of articulation of the actuating link 15 towards the bearing support post 16. This purpose is also served by the offset positioning, which can be seen from FIG. 1, of the articulation of the actuating lever 11 on the manipulator hand 13 in relation to the articulation of the actuating link 15 on the manipulator hand 13.

Mounted rotatably on that side of the manipulator hand 13 which is remote from the bearing shaft 14, at the free end of said manipulator hand, is a manipulator-finger shaft 18, of which the geometrical axis is oriented parallel to the conveying direction, corresponding to the arrow F, and parallel to the geometrical axis of the actuating shaft 10. Connected in a rotationally fixed manner to said shaft are manipulator fingers 19, which bear pushing elements 20 at their free, bottom ends. These pushing elements are produced, at least in their bottom part, from a material with good sliding properties and high wear strength, in order to keep said pushing elements 20 sliding smoothly over the surface of the base plate 4 as they more over said surface.

It should also be mentioned here that according to a particular embodiment, which is not shown specifically here, the rotationally fixed connection of the manipulator fingers 19 to the manipulator-finger shaft 18 may have a small amount of resiliently loaded play, so as to ensure uniform bearing of all the pushing elements on the surface of the base plate 4 when the pushing elements are lowered onto the base plate in order to execute an operating stroke there. This last-mentioned design feature is known per se for an inserter machine.

Moreover, an adjusting ring 21 with a downwardly projecting lever attachment is seated in a rotationally fixed manner on the manipulator-finger shaft 18. This lever attachment stresses a tensioning spring 23 with respect to a downwardly projecting pin 22 fastened on the manipulator hand 13, and said tensioning spring has the effect of prestressing the manipulator-finger shaft 18, and the manipulator fingers 19 connected thereto, in the clockwise direction in relation to the situation which is shown in the drawing.

Finally, a further adjusting ring 24 is fastened on the manipulator-finger shaft 18, a lever attachment 25 projecting away from the said adjusting ring in a radial direction. Said lever attachment 25, at its free end, has two axially spaced-apart guide follower rollers 26 and 27, which are coaxial with one another.

An adjusting ring 28 is fastened on an extension of the actuation shaft 10 which projects beyond the side bearing support 6, on a side of the latter which is remote from the side bearing support 7, and a lever extension 29 projects away from said adjusting ring in the radial direction, the free end of this lever extension 29, as is indicated at 30, being connected in an articulated manner to an actuating rod 31. The actuating rod 31 is moved upwards and downwards in synchronism with the machine cycle by a crank drive (not shown in the drawing) and thus brings about a corresponding, restricted rotation of the actuating shaft 10 in the clockwise and anti-clockwise directions. This results in corresponding, restricted pivoting movements of the actuating lever 11, with the result that the manipulator hand 13, which is also coupled to the bearing support post 16 by the actuating link 15, executes movements back and forth in a region above the base plate 4.

The length of the actuating lever 11 between the geometrical axis of the actuating shaft 10 and of the bearing shaft 12, also the length of the actuating link 15 between the geometrical axis of the bearing support post 16 and of the bearing shaft 14, and further the positions of the geometrical axis of the actuating shaft 10 and of the bearing support post 16 and the mutual spacings between the bearing shaft 14, the bearing shaft 12 and the geometrical axis of the manipulator-finger shaft 18 are selected such that the manipulator-finger shaft 18 moves approximately horizontally over the surface of the base plate 4 during the pivoting movements of the actuating lever 11, over a comparatively large distance. However, during this movement of the manipulator-finger shaft 18, which corresponds either to an operating stroke or to a return stroke of the handling station 5, the manipulator hand 13 is not in any way moved parallel to itself in a horizontal direction over the surface of the base plate 4, at a spacing therefrom, but rather, during the pivoting of the actuating lever 11 about the bearing shaft 12, executes an additional pivoting movement, initiated by the actuating link 15, which, on account of the selected geometry of said three-link mechanism realized in the handling station 5, results in the manipulator-finger shaft 18 remaining at an approximately constant level above the base plate 4 during its operating stroke and during the return stroke.

It can be seen from the illustrations of FIGS. 1 and 2 that the design of the handling station 5, and of the actuating elements thereof, is selected such that free through-passage-channel areas for sheet like articles or sets thereof are formed, above the base plate 4 of the handling station, not just from the conveying path 1, or the conveying chain which contains the conveying fingers 3, but also perpendicularly to the conveying direction corresponding to the arrow F, to the sides, these through-passage-channel areas being designated by 32 and 33 in FIG. 2, while the through-passage-channel area for the sheet like articles above the conveying path 1 is indicated at 34 in FIG. 2. It is only the conveying fingers of conveying chains and/or the manipulator fingers 19 which extend into these areas, while it is not the case in any movement phase of the drive mechanism of the handling station 5 that the rest of the actuating elements or bearing parts of the latter intrude into or violate these through-passage-channel areas for the sheet like articles or sets thereof.

The two guide follower rollers 26 and 27, which are mounted at the free end of the lever attachment of the adjusting ring 24, which is seated on and fastened to the manipulator-finger shaft 18, interact with their respectively associated guide rails 35 and 36. These guide rails are each indicated by chain-dotted lines in FIG. 1. Actuating drives 37 and 38 respectively assigned to each of them adjust their position in relation to the route of the guide follower rollers 26 and 27.

If it is intended for the handling station 5 to operate such that the pushing elements 20 of the manipulator fingers 19 are moved from right to left in an operating stroke, in which they bear on the surface of the base plate 4, and are moved back from left to right in a return stroke, in which they have been raised off from the surface of the base plate 4, then, for example by means of the actuating drive 38, the guide rail 36 is moved upwards to such an extent that it does not in any operating phase come into contact with the guide follower roller 27 assigned to it, whereas the guide rail 35, for the operating stroke of the manipulator fingers 19 and of the pushing elements 20, is moved, by means of the actuating drive 37, into the raised position, which is shown for example in FIG. 2, with the result that, at the beginning of the operating stroke, the guide follower roller 26 can first of all yield upwards, and the tension spring 23, via the manipulator-finger shaft 18, pulls the manipulator finger 19, with the pushing elements 20 arranged thereon, downwards. At the end of the operating stroke, the guide rail 35 is then lowered, by means of the actuating drive 37, to such an extent that the pushing elements 20 in the manipulator fingers 19 are raised and do not reach the through-passage-channel areas 32, 34 or 33 through the entire return stroke of the handling station.

Thereafter, the guide rail 35 is moved into the raised position, as shown for example in FIG. 2, again by the actuating drive 37, in order to prepare the beginning of a new operating stroke.

However, if it is intended for the operating stroke to begin on the left-hand side, starting from the position shown for example in FIG. 2, and to be carried out from left to right with the pushing elements 20 bearing on the surface of the base plate 4, then the guide rail 35 is rendered inoperative by virtue of being raised, by means of the actuating drive 37, and the actuating drive 38 moves the guide rail 36 into the position specified for example in FIG. 2. At the beginning of the stroke in this operating direction, the guide follower roller 27, which is assigned to the guide rail 36, can yield upwards and allow the lowering of the manipulator fingers 19, by the action of the tension spring 23, onto the surface of the base plate 4. At the end of the operating stroke, which has been directed from left to right in relation to the situation in FIG. 2, the guide rail 36 is lowered, by the actuating drive 38, to such an extent that, via the guide follower roller 27 and the lever attachment of the adjusting ring 24 as well as the manipulator-finger shaft 18, the manipulator fingers 19 are raised off from the base plate 4 and the return stroke from right to left is initiated.

As has already been noted in a general observation in relation to the illustrations in the drawings, the actuating arrangement for the manipulator fingers 19 in the form of two guide rails which can be actuated optionally and independently of one another, and of guide follower rollers assigned thereto, is to be understood as a highly schematic illustration. Said actuating arrangement can be modified in a variety of ways. For example, it is possible for individual guide sections to be provided such that they can be adjusted separately and independently of one another along the route of a single guide follower roller, in particular since, during the operating stroke with pushing elements bearing on the surface of the base plate 4, the guide follower rollers or a single guide follower roller are/is not in engagement with the guide rail or the guide rails anyway. In another embodiment, it is also possible to install on the manipulator hand 13 an actuating arrangement in the form of solenoid drives which are supplied with electric control signals via flexible lines from the machine framework and which actuate the manipulator shaft 18 in the desired manner such that either the operating stroke, or in another method of operation the return stroke, is oriented from right to left in relation to the situation of FIG. 2.

In terms of the actuation of the manipulator fingers 19 via a lever attachment attached to the manipulator-finger shaft 18, an embodiment which is not shown in the drawing but which has proven successful in practice is one in which said lever attachment is provided with just a single guide follower roller, which interacts with a single guide rail which can be adjusted by an actuating drive. This guide rail is mounted on a rocker or on a parallelogram, which can be adjusted in height in a straightforward manner by means of the actuating drive, which in the case of this embodiment assumes the function of the above-mentioned actuating drives 37 and 38. By corresponding actuation of the actuating drive, the manipulator fingers 19, via joint guide follower roller, the lever attachment and the manipulator-finger shaft, are lowered during the operating stroke from left to right, and are raised during the return stroke from right to left, or vice versa.

In terms of their movement direction over the base plate 4, the pushing elements 20 at the free ends of the manipulator fingers 19 are designed in essentially the same way on the front side and rear side and are provided with recesses, with the result that they reliably grip the edges of sheet like articles or sets thereof which are to be displaced. Since the manipulator-finger shaft 18 maintains approximately the same level above the surface of the base plate 4 essentially over the entire operating stroke, the angle of the manipulator fingers 19 relative to the surface of the base plate 4 likewise remains essentially the same, although the angle between the manipulator hand 13 and the manipulator finger 19 changes. This, in turn, has the result that the pushing elements 20 also remain approximately parallel to the surface of the base plate 4 during the operating stroke and thus, irrespective of the selected operating direction of the handling station 5, both the front side and the rear side of the pushing elements 20 can be used as that region which acts on the edges of the sheet like articles or sets thereof which are to be displaced.

It is possible to compensate slight twisting of the pushing elements 20 relative to the surface of the base plate 4 during the operating stroke if, according to one configuration, which is illustrated at 40 in FIG. 1, just in a small region around the pushing element 20 which is located furthest to the right, the pushing elements run in grooves of the base plate 4 when the manipulator fingers 19 are in the operating state of the operating stroke. These grooves extend over the entire surface of the base plate 4 in a length which exceeds the length of the operating stroke, but for greater clarity of the illustration, with the above-mentioned exception in FIG. 1, the grooves have not been depicted.

To the right-hand side and left-hand side of the conveying path 1 and of the base plate 4, it is possible to install intermittently driven gripper chains for the purpose of feeding open envelopes to the through-passage-channel areas 32 and 33 for the sheet like articles or sets thereof. Such gripper chains then operate, in conjunction with the handling station 5, as inserter stations, such that sheet like articles or sets thereof which are fed over the conveying path 1 can be inserted into envelopes optionally to the right of left, depending on whether the manipulator fingers 19 and the pushing elements 20 fastened thereon execute their operating stroke, in which they bear on the surface of the base plate 4, from left to right or from right to left.

However, in the case of the embodiment shown in FIGS. 1 and 2, the through-passage-channel areas 32 and 33 for the sheet like articles or sets thereof lead to further conveying paths 41 and 42, which run transversely to the conveying path 1 and are assigned further conveying chains with conveying fingers 43 and 44 fastened thereon. These further conveying chains may be operated continuously or intermittently, whereby their circulatory speed or the operating cycle may be adapted to the operating speed or the operating cycle of the handling station 5. At least one of the conveyer chains having respectively said conveying fingers 43 and 44 can be constructed so that it is reversible in its circulation direction. If, then, in a modified embodiment, a gripper-chain path is provided for the purpose of feeding open envelopes, instead of the conveying path which forms the opposite processing arrangement, then sheet like articles or sets thereof which are to be inserted in envelopes, may optionally be fed from two mutually perpendicular directions, in order for such sheet like articles or sets thereof to be in each case positioned on the base plate 4 and then inserted into envelopes. For example, the sheet like articles may be fed via the conveying path 1 and the conveying path 42, which has been reversed in terms of the chain circulation, and insertion into the envelopes takes place on a gripper-chain path installed at the location of the conveying path 41. However, it is also possible for the arrangement to be such that the sheet like articles are fed optionally via the conveying path 1 and the conveying path 41 and insertion into the envelopes is carried out on a gripper-chain path installed at the location of the conveying path 42 instead of the conveying path 41.

The operation of the conveying fingers 43 and 44 receiving sheet like articles or sets thereof from the pushing elements 20 in order to convey said articles or sets thereof away in the direction of the conveying paths 41 and 42, respectively, takes place such that, upon reaching the upper reach of their conveying chain, the conveying fingers 43 and 44 rise up beyond the respective guide-path surface when the pushing elements 20 have already conveyed the respective edge of the respective article or of the respective set of articles over them.

In a further configuration, the conveying chain which is provided with the conveying fingers 3, and is operated intermittently, may be designed such that it also extends over the base plate 4 in the conveying direction, corresponding to the arrow F, for which purpose the base plate is provided with corresponding slits for the through-passage of the conveying fingers 3. These slits may continue, on the far side of the base plate 4, in a continuing conveying path 45, this making it possible for sheet like articles or sets thereof to be conveyed rectilinearly beyond the conveying path 1 without being processed in the handling station 5, and to be fed to processing stations which are lined up along the continuing conveying path 45. If this method or operation is selected, then the actuation arrangement for the manipulator-finger shaft 18 is switched such that the manipulator fingers 19 are raised off from the base plate 4 both during the displacement of the manipulator hand 13 in one direction and during the return displacement.

The invention claimed is:

1. A mail-processing machine comprising:

(a) an endless circulating, intermittently or continuously driven first conveyor;

(b) a handling station positioned at the output side of said first conveyor; and (c) a first processing arrangement located in the vicinity of said handling station;

(d) wherein said first conveyor has an upper reach defining a first conveyor path and forming intermittently or continuously conveyed transport sections for sheet like articles or sets thereof, said sheet like articles or sets thereof being placeable into said transport sections;

(e) wherein said handling station comprises a manipulator hand having articulated thereto manipulator fingers; a manipulator drive, a base plate and an actuating arrangement for actuating said manipulator fingers;

(f) wherein said manipulator hand is movable by said manipulator drive over said base plate in the direction perpendicular to the conveying direction of said first conveyor so that sheet like articles or sets thereof fed onto the base plate by said first conveyor, are moved by said manipulator fingers into said first processing arrangement, which is located along side the base plate; and (g) wherein said manipulator fingers are raisable and lowerable, respectively, in relation to the base plate by said actuating arrangement;

(h) said manipulator fingers having pushing elements engagable with sheet like articles or sets thereof both in the pushing direction and the pulling direction;

(i) said actuating arrangement being selectably switchable such that said manipulator fingers i) either bear on the base plate during advancement of the manipulator hand and are raised of from the base plate during retraction of the manipulator hand;

ii) or are raised off from the base plate during advancement of the manipulator hand and bear on the base plate during retraction of the manipulator hand; and (j) free through-passage-channel areas for movement of said sheet like articles or sets thereof being formed in regions above the level of the base plate of the handling station, not alone from the side of the circulating first conveyor and in direction to the first processing arrangement, but also to that side of the base plate which is opposite the side on which said first processing arrangement is positioned.

2. The mail-processing machine according to claim 1, wherein a further processing arrangement is located opposite the processing arrangement, which is located alongside the base plate, on the other side of the base plate.

3. The mail-processing machine according to claim 2, wherein at least one of the two mutually opposite processing arrangements, which are positioned adjacent to the base plate and sidewise perpendicularly to the conveying direction of the first conveying path, contains a second conveyer with a conveying direction perpendicular to the first-mentioned conveying path.

4. The mail-processing machine according to claim 3, wherein the conveying direction of the or each arrangement containing said conveyor can be reversed by reversing the drive.

5. The mail-processing machine according to claim 1, wherein at least one of the mutually opposite processing arrangements, which are positioned adjacent to the base plate and sidewise perpendicularly to the conveying direction of the first conveying path, is an operating station for providing open envelopes, in particular with an intermittently driven gripper-chain path, which, or each of which, interacts with the handling station as an inserter station for the sheet like articles or sets thereof which have been conveyed up by the first conveying path.

6. The mail-processing machine according to claim 1, wherein the base plate has slits passing through it, said slits extending in the conveying direction of the first conveying path serving for guiding therein conveying fingers of the first conveying chain or of an auxiliary conveying chain, said conveying fingers, when the manipulator fingers of the handling station have been raised, convey sheet like articles or sets thereof from the base plate to an additional processing arrangement, which adjoins the base plate on that side which is opposite the side from the first conveying path.

7. The mail-processing machine according to claim 6, wherein the additional processing arrangement contains an additional conveyor, in particular conveying chain.

8. The mail-processing machine according to claim 6, wherein the further processing arrangement contains a further processing station, in particular an inserter station.

9. The mail-processing machine according to claim 1, wherein at least one of its conveying chains has a continuously driven chain line and an intermittently driven chain line, the respective conveying fingers of the chain lines running on different tracks, such that the conveying fingers of the respective intermittently operated chain line, which are moved at a greater conveying speed in intermittent operation, receive sheet like articles or sets thereof from the conveying transport section of the continuously operated chain line.

10. The mail-processing machine according to claim 1, wherein the actuating arrangement contains guide follower means which are connected to a shaft mounting the manipulator fingers on the manipulator hand, and which make contact with a switch-over guide rail arrangement.

11. The mail-processing machine according to claim 1, wherein the manipulator drive of the handling station has a three-link mechanism, which comprises a framework-mounted actuating lever, which is driven to produce oscillating pivoting movements, a framework-mounted actuating link and the manipulator hand, whereby the actuating link is pivotably connected to one manipulator hand end and the manipulator fingers are articulated at the other manipulator hand end, while the actuating lever is articulated on the manipulator hand between the points of articulation of the latter for the actuating link and the manipulator fingers, and the three-link mechanism is dimensioned, and the points of articulation on the framework are selected in such way that, during a substantial part of the operating stroke and of the return stroke of the manipulator hand, the point of articulation of the manipulator fingers moves essentially parallel over the base plate.

* * * * *